US011329757B2

(12) United States Patent
Gapin et al.

(10) Patent No.: US 11,329,757 B2
(45) Date of Patent: May 10, 2022

(54) TRANSMITTING APPLICATION DATA USING DIFFERENT QOS SPECIFICATIONS

(71) Applicant: T-Mobile USA, Inc., Bellevue, WA (US)

(72) Inventors: Andrew Gapin, Seattle, WA (US); Jeff Ahmet, Issaquah, WA (US); Paul Bongaarts, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 12 days.

(21) Appl. No.: 16/657,963

(22) Filed: Oct. 18, 2019

(65) Prior Publication Data

US 2021/0119724 A1 Apr. 22, 2021

(51) Int. Cl.
| | |
|---|---|
| *H04L 1/00* | (2006.01) |
| *H04W 72/08* | (2009.01) |
| *H04W 28/16* | (2009.01) |
| *H04W 72/10* | (2009.01) |
| *H04W 72/12* | (2009.01) |
| *H04L 65/1069* | (2022.01) |
| *H04L 65/10* | (2022.01) |

(52) U.S. Cl.
CPC ........... *H04L 1/0006* (2013.01); *H04W 28/16* (2013.01); *H04W 72/085* (2013.01); *H04W 72/10* (2013.01); *H04W 72/1231* (2013.01); *H04L 65/1006* (2013.01); *H04L 65/1069* (2013.01)

(58) Field of Classification Search
CPC ..................................................... H04L 1/0006
See application file for complete search history.

(56) References Cited

U.S. PATENT DOCUMENTS

| | | | | |
|---|---|---|---|---|
| 2010/0284284 | A1* | 11/2010 | Khandelwal | ........ H04L 65/1069 370/248 |
| 2014/0185526 | A1* | 7/2014 | Aksu | ....................... H04W 4/50 370/328 |
| 2016/0344863 | A1* | 11/2016 | Ehlen | .................... H04M 15/00 |
| 2017/0019852 | A1* | 1/2017 | Yang | ..................... H04W 24/08 |

(Continued)

OTHER PUBLICATIONS

Ericsson white paper entitled "Voice and Video Calling Over LTE", Feb. 2012, 18 pages. (Year: 2012).*

*Primary Examiner* — Edan Orgad
*Assistant Examiner* — Won Tae C Kim
(74) *Attorney, Agent, or Firm* — Lee & Hayes, P.C.

(57) ABSTRACT

A telecommunication network associated with a wireless telecommunication provider can be configured to transmit application data using different quality of service (QoS) specifications. In some configurations, data, other than voice and video data, can be transmitted using VoLTE or ViLTE data streams. According to some examples, network hardware and/or software (e.g., in the core network of a telecommunications network), and/or an application on the UE (smartphone, tablet, etc.) may translate data to be compatible with the VoLTE or ViLTE specifications. The translated data is transmitted from the device to the telecommunications network as a VoLTE or ViLTE packet stream. The converted packets may be identified (e.g., a unique digital signature) so that the corresponding hardware and software in the MSO can identify that a stream of VoLTE or ViLTE packets is to be converted back into the native format of the application before being routed to a destination.

17 Claims, 4 Drawing Sheets

(56) References Cited

U.S. PATENT DOCUMENTS

| | | | |
|---|---|---|---|
| 2018/0213444 A1* | 7/2018 | Khawand | H04L 47/805 |
| 2020/0137623 A1* | 4/2020 | Nirwani | H04L 47/803 |
| 2020/0196214 A1* | 6/2020 | Martinez-Heath | H04L 43/04 |
| 2020/0252440 A1* | 8/2020 | El-Gawady | H04L 65/1059 |
| 2020/0359449 A1* | 11/2020 | Kim | H04W 28/06 |

* cited by examiner

TRANSMITTING APPLICATION DATA USING DIFFERENT QOS SPECIFICATIONS

BACKGROUND

Modern telecommunications networks such as cellular telephone networks can support a variety of sessions, such as voice, video, or messaging. In some configurations, a network, such as a Fourth-generation (4G) cellular network may utilize Voice-over-long-term-evolution (VoLTE) and Video-over-long-term-evolution (ViLTE) standards for providing voice and video calls. Generally, VoLTE and ViLTE utilize shorter scheduling intervals with prioritized scheduling delivery of packets to help ensure smooth functionality of service operation for voice and video calls with minimal disruption from variations in latency or packet delivery. Data that is not transmitted using VoLTE or ViLTE is prioritized lower, and as a result may experience higher latencies as compared to data transmitted using VoLTE or ViLTE.

BRIEF DESCRIPTION OF THE DRAWINGS

The detailed description is set forth with reference to the accompanying figures.

DETAILED DESCRIPTION

Figure 1:
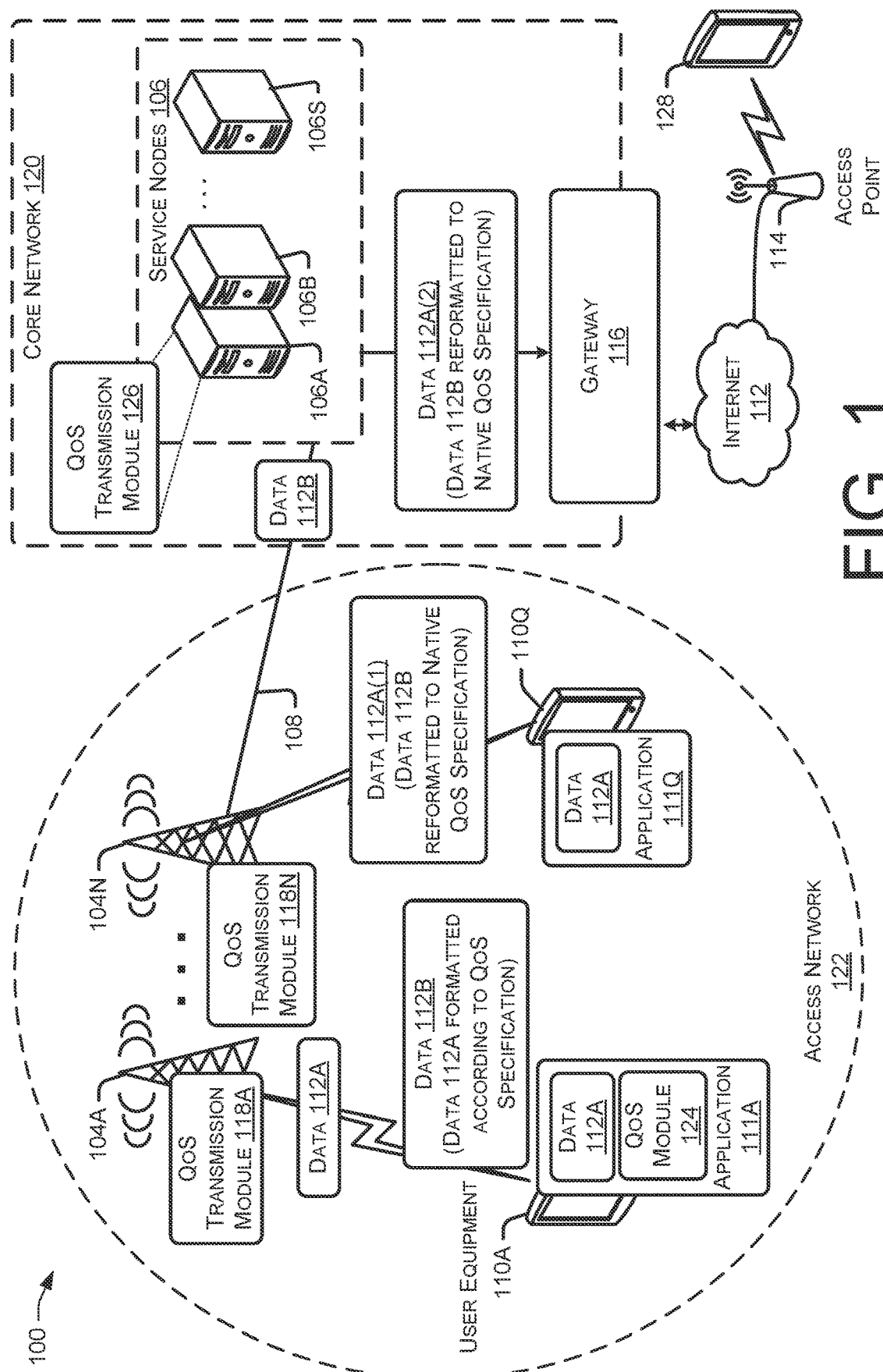
FIG. 1 is a block diagram showing an illustrative environment for transmitting application data using different QoS specifications in a cellular network.

Described herein are techniques and systems for transmitting application data using different quality of service (QoS) specifications. Using techniques described herein, a network, such as a telecommunication network associated with a wireless service provider, can be configured to utilize the priority, lower latency, and greater consistency of VoLTE or ViLTE data streams to transmit other types of data, such as application data. As used herein "application data" refers to data that is not voice data and/or video data that is natively transmitted using VoLTE and/or ViLTE.

As an example, instead of only using VoLTE and ViLTE for transmitting voice and video data, a game application may format game data received from a game controller (or some other device and/or interface, such as touchscreen interface) into data stream that is compatible with VoLTE and/or ViLTE data streams. In other examples, the application may select some other QoS specification (e.g., a QoS specification that is associated with guaranteed bitrate and/or latency). In some configurations, network hardware and/or software (e.g., within an access network and/or in the core network of a telecommunications network), and/or an application on the user equipment (UE) (smartphone, tablet, etc.) may translate application data to be compatible with the VoLTE or ViLTE specifications, or some other identified QoS specification.

According to some configurations, a portion of application data may be transmitted according to VoLTE and ViLTE specifications, while another portion of the application data may be transmitted using a different QoS specification, such as the native QoS specification associated with the application data. For instance, the application data that is latency-sensitive, may be formatted and transmitted using VoLTE and/or ViLTE (or some other suitable QoS specification), while other application data that is not latency-sensitive may be transmitted using a different QoS specification. As an example, a game application may format and transmit data received from a game controller using VoLTE and ViLTE, while the game application may transmit other application data in the native format without conversion to VoLTE and ViLTE.

In some configurations, an application may identify the data to convert to VoLTE or ViLTE packets. The converted data is transmitted from the device to the telecommunications network as a VoLTE or ViLTE packet stream. The converted packets may be identified (e.g., a unique digital signature, an indication within the message, or some other identifier) so that hardware and/or software associated with the telecommunications network can identify that a stream of VoLTE or ViLTE packets is to be converted back into the native format of the application before being delivered to a destination endpoint (e.g., a network device).

The application data may be transmitted across different networks. For example, the networks may be LTE networks (e.g., Mid-Band Frequencies. LTE 2.1 GHz+LTE 1.9 GHz), 5G networks, and/or some other frequency(s) (e.g., 2.5 GHz). More details are provided below with reference to FIGS. 1-4.

FIG. 1 is a block diagram showing an illustrative environment 100 for transmitting application data using different QoS specifications in a cellular network. The environment 100 may include a core network 120 and an access network 122 that is associated with a wireless service provider. The environment 100 is illustrated in simplified form and may include many more components.

The environment 100 may include nodes 104, such as nodes 104A-104N, which may also be referred to herein as "cells". The nodes 104 may be wireless nodes or wired nodes that are coupled to core network 120 and/or some other network. The environment 100 may also include one or more access points 114, one or more gateways 116, and one or more service nodes 106. A node, such as a node 104 may handle traffic and signals between electronic devices, such as the user equipment 110A-110Q, 128, and a core network 120. For example, a node 104 may perform the transcoding of speech channels, allocation of radio channels to electronic devices, paging, transmission and reception of voice and data, as well as other functions. A node 104 may include several base transceiver stations (BTS), each BTS may include a transceiver, antenna, and additional network switch and control equipment that provide a network cell for facilitating wireless communication between UE computing devices and the core network 120. In some examples, the nodes 104 include a gNodeB and/or an eNodeB.

The core network 120 may be responsible for performing functionality relating to transmitting application data using different QoS specifications, routing voice communication to other networks, as well as routing data communication to external packet switched networks, such as the Internet 112. For example, the one or more service nodes 106A-106S may be a Gateway GPRS Support Node (GGSN) or another equivalent node. According to some configurations, the one or more service nodes also include a Policy and Charging Rules Function (PCRF) node that utilized to enforce policy rules of the network. The PCRF node can be configured to automatically make policy decisions for each subscriber (e.g., each user equipment (UE)) active on the network. For example, the PCRF may be utilized to allocate bandwidth of the network as well as provide different levels of service to different computing devices on the network. Additionally, some data can be prioritized within the network.

The user equipment 110 are computing devices that can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data using a cellular access network 122, and/or over a Wi-Fi network, or some other type of network. In some instances, the UE 110 computing devices can be configured to send and receive data using any wired or wireless protocols. Additional examples of the UE 110 include, but are not limited to, smart devices such as televisions, music players, vehicles (e.g., cars, trucks, buses, . . . ), Internet of Things (IoT) computing devices, or any other electronic appliances or computing devices that can generate, request, receive, transmit, or exchange voice, video, and/or digital data over a network. The UE 110 can further be configured to establish or receive a communication session, such as a VoLTE, VoNR, VoWifi, or other voice call, a video call, or another sort of communication. Establishment of such sessions can involve communication clients and Session Initiation Protocol (SIP) clients to communicate with the telecommunications network.

In some configurations, one or more of the service nodes 106 may be configured as one or more application servers that provide support for one more applications, such as application 111 utilized by one or more user equipment 110 computing devices. Some example applications include, but are not limited to browser applications, messaging applications, voice applications (e.g., Voice over Internet Protocol "VoIP" applications), video applications, game applications, and the like.

While the service nodes 106 are illustrated within the core network 120, one or more other computing devices may be located outside of the core network 120. For example, an application server, or some other server or device, may be connected to the core network 120 via one or more external packet switched networks, such as the Internet. In some examples, one or more computing devices outside of the core network 120 may be utilized to perform processing related to transmitting application data using different quality of service (QoS) specifications.

According to some configurations, a client application, such as application 111, on the UE 110A may establish data communication with the network 120 through a data connection to the node 104A. The node 104A may route a communication wired/wirelessly from the UE 110A through the access network 122 for communication to the core network 120. Similarly, node 104N may route a communication wired/wirelessly from the UE 110Q through the access network 122 for communication within the access network 122 and/or to the core network 120.

When a communication request arrives at the network 120, one or more of the service nodes 106 may determine the identity of the originating computing device for the communication (e.g., using a telephone number, IMEI, IMSI, IP address) as well as the identity of the computing devices to send the communication. According to some configurations, a UE 128 may connect to the service nodes 106, or some other component such as an application server, via the Internet 112. In such instances, the UE 128 may connect to the Internet 112 via Wi-Fi access point 114. Accordingly, data traffic from the UE 128 may be routed to the service nodes 106 by the gateway 116 of the network 120.

In some configurations, a wireless service provider may utilize alternative access vendor (AAV) networks, for example, which utilize Ethernet networks to provide a wired connection, such as wired connection 108, to provide at least a portion of backhaul for broadband cellular services, such as 5G networks. In other examples, the wireless service provider may deploy its own wired connections.

In general, a node 104 can be implemented as a variety of technologies to provide wired and/or wireless access to the network, as discussed herein. In some instances, the nodes 104 can include a 3GPP RAN, such a GSM/EDGE RAN (GERAN), a Universal Terrestrial RAN (UTRAN), an evolved UTRAN (E-UTRAN), or a New Radio (5G) RAN, or alternatively, a "non-3GPP" RAN, such as a Wi-Fi RAN, or another type of wireless local area network (WLAN) that is based on the IEEE 802.11 standards. Further, the nodes 104 can include any number and type of transceivers and/or base stations representing any number and type of macrocells, microcells, picocells, or femtocells, for example, with any type or amount of overlapping coverage or mutually exclusive coverage. The nodes 104 can be associated with access network 122.

As shown in FIG. 1, some nodes 104 have no physical (i.e., "wired") data connection to network. In other words, some of the nodes, such as node 104A, are not connected to the core network 120 using fiber cabling, copper cabling, and/or some other type of wired connection. The nodes 104 that do not have a wired connection may be connected to one or more wired nodes 104, such as node 104N, that does have a wired connection to the core network 120. A wired node utilizes fiber, or other wired data connections, to connect to the core network 120. As shown, wired node 104N connects to the core network via an Ethernet connection 108 via a fiber optic, coaxial, or other high speed wired data connection. A wired node 104, such as node 104N, could also be connected by a coaxial, T1, T3, or other suitable high-speed connection to the core network 120. In some configurations, mesh networking technology can be used to connect different nodes 104 within the access network 122. Geographic Information Services (GIS) and other terrain and location information systems can be used to determine nodes to provide a connection between one or more non-wired nodes and a network 120.

In some instances, the environment 100 can further include one or more servers, including service nodes 106, to facilitate communications by and between the various devices in the environment 100 and perform operations relating to transmitting application data using different quality of service (QoS) specifications. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, Evolved High-Speed Packet Access (HSPA+) are examples of 4G, and 5G NR is an example of 5G telecommunications technologies. Thus, the environment 100 may implement GSM, UMTS, LTE/LTE Advanced, and/or 5G NR telecommunications technologies.

The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UE 110, the nodes 104, and one or more endpoints of the network (e.g., service nodes 106, websites, etc.). While FIG. 1 illustrates an example environment 100, it is understood in the context of this document, that the techniques discussed herein may also be implemented in other networking technologies.

The access network 122 can be any sort of access network, such as a GSM or UMTS network. The access network 122 can include any aspects of one or more of second, third, fourth generation, and fifth generation (2G, 3G, 4G, and 5G) cellular-wireless access technologies. The access network 122 can also be referred to as a universal terrestrial radio network (UTRAN) or a GSM EDGE radio access network (GERAN) and can include one or base stations, as well as a radio network controller (RNC).

As briefly discussed above, a network, such as an access network 122 associated with a wireless telecommunication service provider, can be configured to transmit application data using different quality of service (QoS) specifications. According to some configurations, the different QoS specifications may be associated with a QoS Class Identifier (QCI). A QCI is a value that identifies the bearer type for the data. Generally, as network congestion increases data that is associated with a higher priority is transmitted before data with a lower priority. For instance, VoLTE data is transmitted before application data.

As briefly discussed above, an application, such as application 111A, may determine to transmit all or a portion of application data 112A at a higher priority compared to the native format of the data 112. In some configurations, the application 111A identifies a QCI to associate with at least a portion of the data 112A to be transmitted. In some examples, QoS levels are identified by LTE QoS Class Identifiers (QCIs). Each QCI defines particular latency, packet priority, and packet-loss rate requirements. For example, voice-over-LTE (VoLTE) data-transport services may be provided at QCI 1, video-over-LTE (ViLTE) video data-transport services may be provided at QCI 2, IMS signaling provided at QCI 5, and non-GBR packet data provided at QCI 6. In other configurations, a default QoS specification (e.g., VoLTE, ViLTE) may be associated with the portion of data to be transmitted at a higher priority. In some examples, the system 100 (or components thereof, and likewise throughout the discussion of this figure) utilizes QCI 1, video-over-LTE (ViLTE) video data-transport services at QCI 2. Utilizing the QoS levels for data other than voice or video provides predetermined QoS levels (e.g., associated with predetermined QCIs) for packet data flows, such as media-packet flows associated with apps other than voice and video calls.

In the example illustrated in FIG. 1, the UE 110A initially connects to node 104A. When the node 104A is not experiencing congestion, the data, such as data 112A, transmitted by UE 110A may not experience much latency. As the node 104A becomes more congested, however, less resources may be allocated to UE 110A resulting in reduced throughput of data 112A and/or increased latency.

When node 104A is experiencing cell congestion, the QoS may be poor and the user experience may not be good. Utilizing techniques described herein, however, the application 111 may identify the data 112A to transmit using a specific QoS that is not normally associated with the data 112A. For instance, application 111A may identify all or a portion of the data 112A to transmit according to a different QoS specification (e.g., using VoLTE or ViLTE).

In the current example, the QoS module 124 is configured to convert the identified portion of data 112A from the native format associated with a native QoS to a QoS format that is associated with the selected QoS. Generally, the application 111A may select a QoS specification to match a desired bitrate and/or latency. In some configurations, other network hardware and/or software within the access network 122 and/or in the core network 120, may translate or format application data 112A to be compatible with a different QoS specification, such as the VoLTE or ViLTE specifications.

According to some configurations, a portion of application data 112A may be transmitted as data 112B (e.g., according to VoLTE and ViLTE specifications), while another portion of the application data 112A may be transmitted according to the native QoS specification (e.g., without using VoLTE and ViLTE). For instance, the application data 112A that is latency-sensitive for the application 111A, may be formatted and transmitted using a QoS specification that meets the latency needs of the application 111A, while other application data 112A that is not latency-sensitive may be transmitted using the native format.

After the QoS module 124, or some other component or device, generates the data 112B by formatting the data 112A according to the QoS specification, the data 112B is transmitted from the UE 110A to the telecommunications network as a packet stream according to the QoS standard (e.g., a VoLTE or ViLTE packet stream).

In some examples, the QoS module 124 includes data identifying the data 112B as converted data that is associated with a different native format. For instance, the QoS module 124 may associate an identifier with the data 112B (e.g., a unique digital signature, an indication within the message, or some other identifier) so that hardware and/or software associated with the access network 122 and/or the core network 120, or some other device or component can identify that a stream of data 112B packets is to be converted back into the native format of the application 111A before routed to a destination.

As illustrated, a QoS transmission module 118, such as QoS transmission module 118A, 118N, and/or 126 may receive data 112B, identify that the data 112B is to be converted back to the native format, and convert the data 112B back to data 112A. In the examples illustrated in FIG. 1, the data 112B may be converted by QoS transmission module 118N of node 104N before delivering the data 112A(1) to UE 110Q. In other examples, the UE 110Q may receive the data 112B and convert it to the format of data 112A. As another example, the data 112B may be converted by QoS transmission module 126 of service node 106A before delivering the data 112A(2), to UE 128. In other examples, the UE 128 may receive the data 112B and convert it to the format of data 112A. The application data 112A and 112B and other data may be transmitted across different networks. For example, the networks may be LTE networks (e.g., Mid-Band Frequencies: LTE 2.1 GHz+LTE 1.9 GHz), 5G networks, and/or some other frequency(s) (e.g., 2.5 GHz). More details are provided below with regard to FIGS. 2-4.

Figure 2:
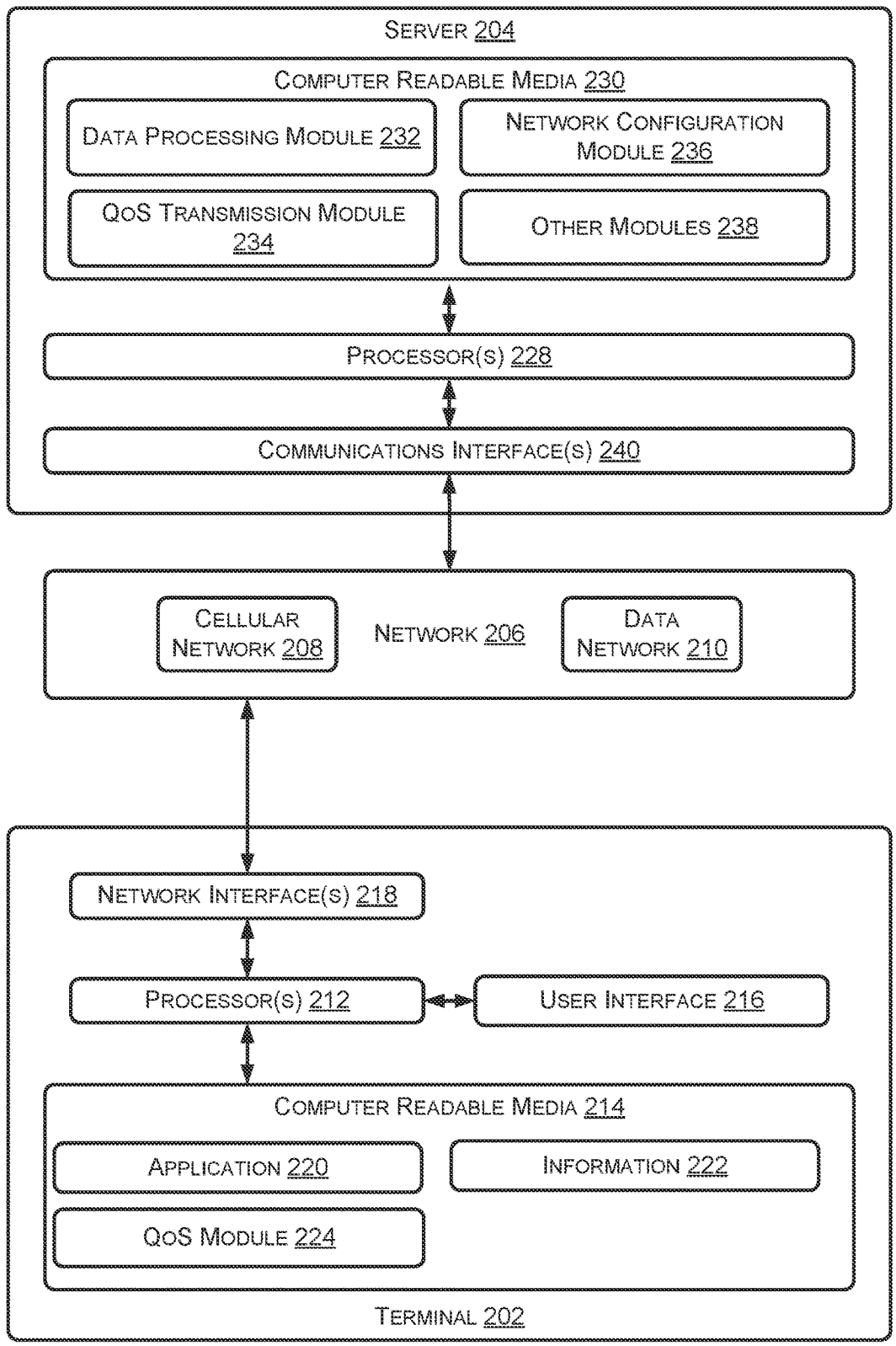
FIG. 2 is a block diagram illustrating a system that includes one or more modules for transmitting application data using different QoS specifications in a cellular network.

FIG. 2 is a block diagram illustrating a system 200 that includes one or more modules for transmitting application data using different QoS specifications in a cellular network according to some implementations. The system 200 includes a terminal 202, which can represent a User Endpoint (UE) 110, or another computing device, coupled to a server 204, via a network 206. The server 204 can represent a computing device, such as one or more of the servers within the network 120 and/or access network 122, and/or some other computing device. The network 206 can represent network 120 and/or access network 122, or some other network.

The network 206 can include one or more networks, such as a cellular network 208 and a data network 210. The network 206 can include one or more core network(s) connected to terminal(s) via one or more access network(s). Example access networks include LTE, WIFI, GSM Enhanced Data Rates for GSM Evolution (EDGE) Radio Access Network (GERAN), UTRAN, and other cellular access networks. Message transmission, reception, fallback, and deduplication as described herein can be performed, e.g., via 3G, 4G, 5G, WIFI, or other networks.

The cellular network 208 can provide wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 204 and terminals such as the terminal 202 can additionally or alternatively be performed using other technologies, such as wired (Plain Old Telephone Service, POTS, or PSTN lines), optical (e.g., Synchronous Optical NETwork, SONET) technologies, and the like.

The data network 210 can include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the server 204 includes or is communicatively connected with an IWF or other device bridging networks, e.g., LTE, 3G, and POTS networks. In some examples, the server 204 can bridge SS7 traffic from the PSTN into the network 206, e.g., permitting PSTN customers to place calls to cellular customers and vice versa.

In some examples, the cellular network 208 and the data network 210 can carry voice or data. For example, the data network 210 can carry voice traffic using VoIP or other technologies as well as data traffic, or the cellular network 208 can carry data packets using HSPA, LTE, or other technologies as well as voice traffic. Some cellular networks 208 carry both data and voice in a PS format. For example, many LTE networks carry voice traffic in data packets according to the VoLTE standard. Using techniques described herein, data other than voice traffic, may be transmitted in data packets according to the VoLTE standard, or some other standard. Various examples herein provide origination and termination of, e.g., carrier-grade voice calls on, e.g., networks 206 using CS transports or mixed VoLTE/3G transports, or on terminals 202 including OEM handsets and non-OEM handsets.

The terminal 202 can be or include a wireless phone, a wired phone, a tablet computer, a laptop computer, a wristwatch, an IoT device, a vehicle, a computing device, or other type of terminal. The terminal 202 can include one or more processors 212, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 214, such as memory (e.g., random access memory (RAM), solid state drives (SSDs), or the like), disk drives (e.g., platter-based hard drives), another type of computer-readable media, or any combination thereof. The CRM or other memory of terminal 202 can hold a datastore.

The terminal 202 can further include a user interface (UI) 216, e.g., including an electronic display device, a speaker, a vibration unit, a touchscreen, or other devices for presenting information to a user and receiving commands from the user. The terminal 202 can further include one or more network interface(s) 218 configured to selectively communicate (wired or wirelessly) via the network 206, e.g., via an access network 122.

The CRM 214 can be used to store data and to store instructions that are executable by the processors 212 to perform various functions as described herein. The CRM 214 can store various types of instructions and data, such as an operating system, device drivers, etc. The processor-executable instructions can be executed by the processors 212 to perform the various functions described herein.

The CRM 214 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 212. Tangible computer-readable media can include volatile and nonvolatile, removable and non-removable media implemented in any method or technology for storage of information, such as computer readable instructions, data structures, program modules, or other data.

The CRM 214 can include processor-executable instructions of an application 220. As discussed herein, the application 220 may be configured to use QoS module 224 (which may correspond to QoS Module 124) to format at least a portion of application data 112 into a different format that is associated with a selected QoS specification. For example, all or a portion of the data 112A may be formatted to follow the VoLTE standards. The CRM 214 can store information 222 identifying the terminal 202. The information 222 can include, e.g., an IMEI, an IMSI identifying the subscriber using terminal 202, or other information discussed above. The information 222 may also store data that indicates what QoS to utilize when transmitting application data 112 using a different QoS specification. The CRM 214 can additionally or alternatively store credentials (omitted for brevity) used for access, e.g., to IMS or RCS services.

The server 204 can include one or more processors 228 and one or more CRM 230. The CRM 230 can be used to store processor-executable instructions of a data processing module 232, a QoS transmission module 234 which may be QoS transmission module 118, a network configuration module 236, as well as one or more other modules 238. The processor-executable instructions can be executed by the one or more processors 228 to perform various functions described herein.

In some examples, server 204 can communicate with (e.g., is communicatively connectable with) terminal 202 or other devices via one or more communications interface(s) 240, e.g., network transceivers for wired or wireless networks, or memory interfaces. Example communications interface(s) 240 can include ETHERNET or FIBRE CHANNEL transceivers, WIFI radios, or DDR memory-bus controllers (e.g., for DMA transfers to a network card installed in a physical server 204).

In some examples, processor 212 and, if required, CRM 214, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 228 and, if required, CRM 230.

Figure 3:
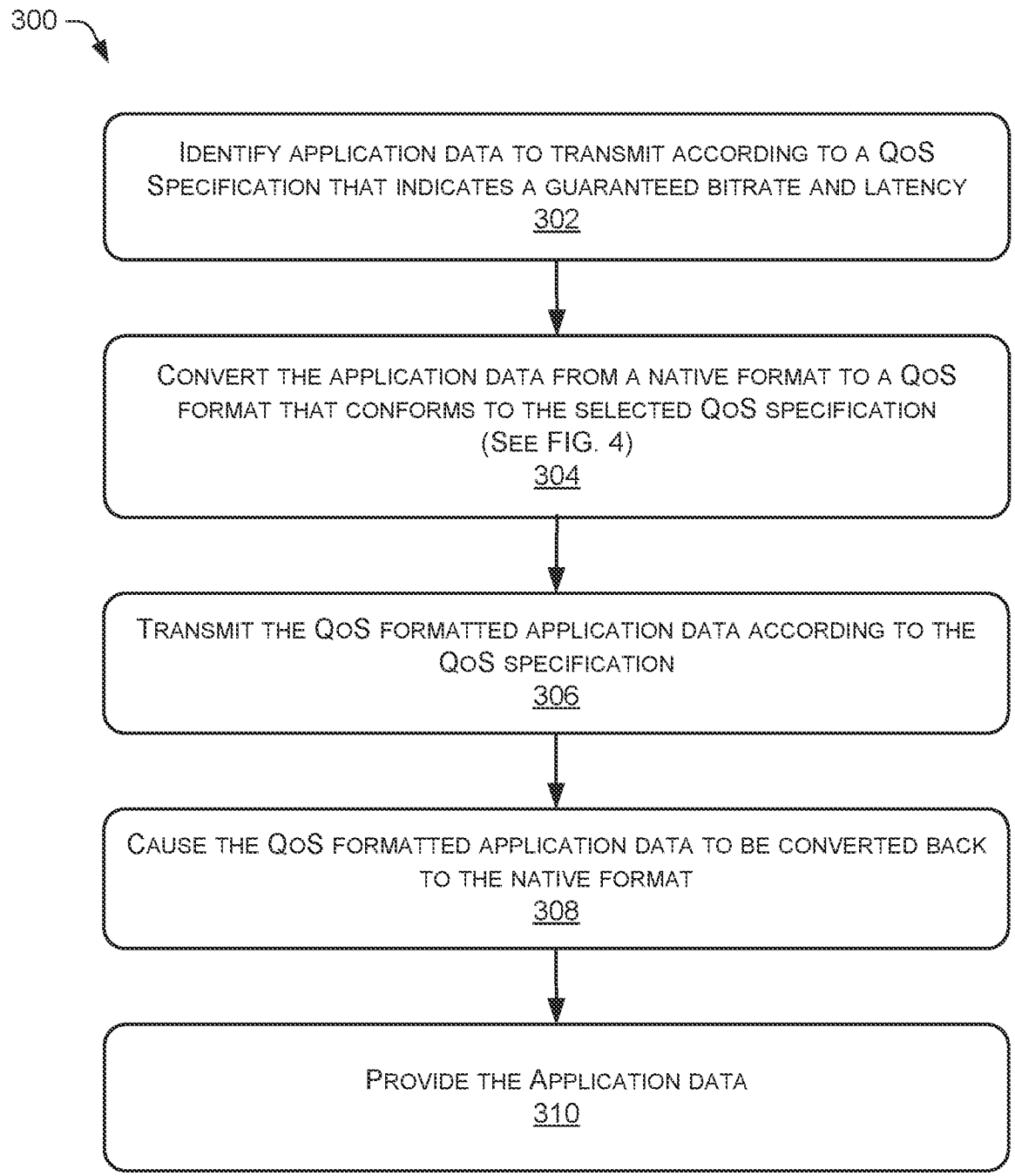
FIG. 3 is a flow diagram of an example process that includes transmitting application data using different QoS specifications in a cellular network according to some implementations.
Figure 4:
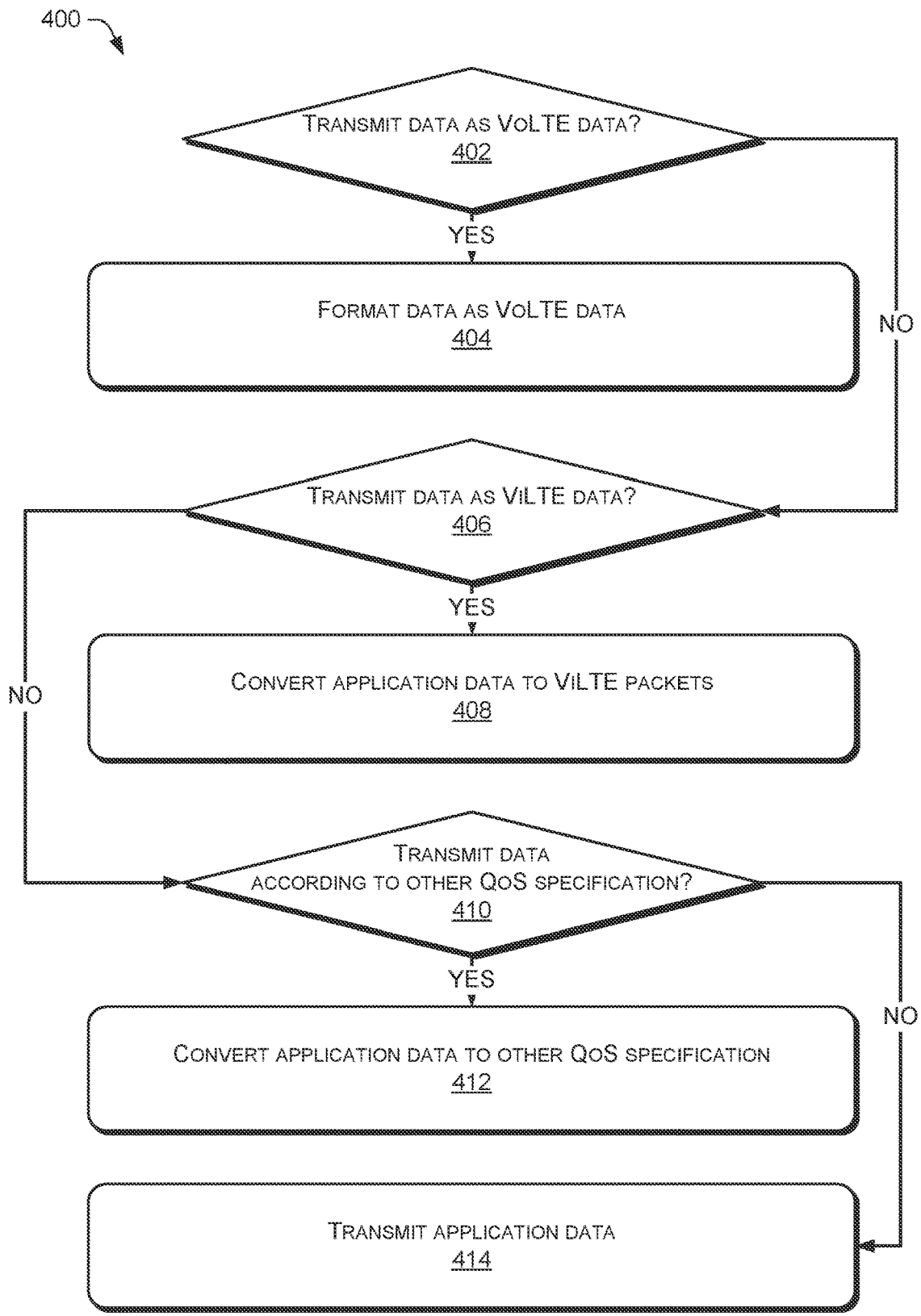
FIG. 4 is a flow diagram of an example process that includes formatting application data to conform to a QoS specification according to some implementations

FIG. 3 and FIG. 4 illustrate example processes. Each of these processes are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates an example process for transmitting application data 112 using different quality of service (QoS) specifications. The process includes, at 302, identifying application data 112A to transmit according to a QoS specification. In some examples, the QoS specification is selected from the VoLTE specification or the ViLTE specification. In other examples, the selection may be made from other QoS specifications (e.g., different QCIs). Some of the QoS specifications are associated with a guaranteed bitrate and latency.

As discussed above, in some configurations, the application 111 that is transmitting data 112A determines what portion of data 112A to transmit according to a different QoS specification as compared to the native format of data 112A. In other configurations, some data 112A may be automatically selected for transmission using a different QoS specification. The selection may be based on the type of data (e.g., controller data, or other types of data that are latency sensitive).

At 304, the application data 112A is converted from the native format to a QoS format (e.g., data 112B) that conforms to the specification associated with the QoS specification. As discussed above, UE 110, a QoS module 124, a QoS transmission module 118, or some other component or device may be utilized to format the data 112B to conform to the identified QoS specification. See FIG. 4 and related discussion for more details.

At 306, the QoS formatted application data 112B is transmitted according to the QoS specification. As discussed above, the UE 110 may transmit the data 112B according to the identified QoS specification and the data 112A according to the native QoS specification.

At 308, the QoS formatted application data 112B is caused to be converted back to the native format data 112A. As discussed above, a QoS transmission module 118 may receive data 112B, identify that the data 112B is to be converted back to the native format data 112A, and convert the data 112B back to the native format data 112A before being delivered to a final destination. In some configurations, a UE 110 may receive the data 112B and convert it back to data 112A.

At 310, the application data is provided. As discussed above, the data 112A may be delivered to the destination using the native format. In this way, the data 112A being requested from an endpoint (e.g., a requesting device, Internet Site) can be understood by that endpoint.

FIG. 4 illustrates an example process for formatting application data 112A to conform to a QoS specification. The process includes, at 402, a determination as to whether to transmit the application data 112A as VoLTE data. When the data 112A is to be transmitted as VoLTE data, the process 400 moves to 404. When the data 112A is not to be transmitted as VoLTE data, the process 400 moves to 406.

At 404, the data 112A is formatted as VoLTE data. As discussed above, the UE 110, a QoS module 124, a QoS transmission module 118, or some other device or component may be utilized to format the data 112A to conform to the VoLTE specification.

At 406, a determination as to whether to transmit the application data 112A as ViLTE data. When the data is to be transmitted as ViLTE data, the process 400 moves to 408. When the data is not to be transmitted as ViLTE data, the process 400 moves to 410.

At 408, the data is formatted as ViLTE data. As discussed above, the UE 110, a QoS module 124, a QoS transmission module 118, or some other device or component may be utilized to format the data 112A to conform to the ViLTE specification.

At 410, a determination as to whether to transmit the application data 112A according to some other QoS specification. When the data is to be transmitted according to some other QoS specification, the process 400 moves to 412. When the data is not to be transmitted according to some other QoS specification, the process 400 moves to 414.

At 412, the data 112A is formatted according to the other QoS specification. As discussed above, the UE 110, a QoS module 124, a QoS transmission module 118, or some other device or component may be utilized to format the data 112A to conform to the other QoS specification.

At 408, the data 112A that is not to be transmitted according to a QoS specification is transmitted.

Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:
1. A system comprising:
one or more processors;

a memory; and one or more components stored in the memory and executable by the one or more processors to perform operations comprising:

identifying first data of an application executing on a device to transmit according to a Quality of Service (QoS) specification, wherein the QoS specification indicates a guaranteed bitrate and a first service latency, wherein the QoS specification is associated with a Voice-over-long-term-evolution (VoLTE) standard or a Video-over-long-term-evolution (ViLTE) standard, and wherein the first data is output by the application in a first format that does not conform to the QoS specification;

generating second data by converting the first data from the first format to a second format that conforms to the QoS specification;

transmitting the second data from the device to a telecommunications network, wherein the second data provides an indication to one or more computing devices of the telecommunications network to convert the second data from the second format to the first format; and transmitting third data output by the application from the device to the telecommunications network, wherein the third data is output in the first format and is not converted to the second format.

2. The system of claim 1, wherein a type of the first data of the application is associated with a different QoS specification for transmission that has one or more of a non-guaranteed bitrate or a second service latency that is longer than the first service latency.

3. The system of claim 1, the operations further comprising including an identifier in one or more packets of the second data to provide the indication to the one or more computing devices of the telecommunications network to convert the second from the second format to the first format.

4. The system of claim 1, wherein generating the second data comprises formatting packets of the first data to correspond to a packet format associated with the QoS specification.

5. The system of claim 1, wherein the first data is video game controller data and the application is a video game application.

6. A computer-implemented method performed by one or more processors configured with specific instructions, the computer-implemented method comprising:

identifying first data of an application executing on a device to transmit according to a QoS specification, wherein the QoS specification indicates a guaranteed bitrate and a first service latency, wherein the QoS specification is associated with a Voice-over-long-term-evolution (VoLTE) standard or a Video-over-long-term-evolution (ViLTE) standard, and wherein the first data is output by the application in a first format that does not conform to the QoS specification;

generating second data by converting the first data from the first format to a second format that conforms to the QoS specification;

transmitting the second data from the device to a telecommunications network, wherein the second data provides an indication to convert the second data from the second format to the first format; and transmitting third data output by the application from the device to the telecommunications network, wherein the third data is output in the first format and is not converted to the second format.

7. The computer-implemented method of claim 6, wherein a type of the first data of the application is associated with a different QoS specification for transmission that has one or more of a non-guaranteed bitrate or a second service latency that is longer than the first service latency.

8. The computer-implemented method of claim 6, further comprising including an identifier in the second data to provide the indication to one or more computing devices of the telecommunications network to convert the second data from the second format to the first format.

9. The computer-implemented method of claim 6, wherein generating the second data comprises formatting packets of the first data to correspond to a packet format associated with the QoS specification.

10. The computer-implemented method of claim 6, wherein the indication to convert the second data from the second format to the first format causes one or more computing devices of the telecommunications network to convert the data from the second format to the first format.

11. The computer-implemented method of claim 6, wherein the indication to convert the second data from the second format to the first format causes one or more computing devices of the telecommunications network located at one or more nodes within an access network associated with the telecommunications to convert the data from the second format to the first format.

12. The computer-implemented method of claim 6, wherein the first data is video game controller data and the application is a video game application.

13. A non-transitory computer-readable media storing computer-executable instructions that, when executed, cause one or more processors of a computing device to perform acts comprising:

identifying first data of an application to transmit according to Quality of Service (QoS) specification, wherein the QoS specification is associated with a Voice-over-long-term-evolution (VoLTE) standard or a Video-over-long-term-evolution (ViLTE) standard, and wherein the first data is output by the application in a first format that does not conform to the QoS specification;

generating second data by converting the first data from the first format to a second format that conforms to the QoS specification;

transmitting the second data, formatted according to the second format, to a telecommunications network, wherein the second data provides an indication to one or more computing devices associated with the telecommunications network to convert the second data from the second format to the first format; and transmitting third data output by the application from the device to the telecommunications network, wherein the third data is output in the first format and is not converted to the second format.

14. The non-transitory computer-readable media of claim 13, wherein a type of the first data of the application is associated with a different QoS specification for transmission.

15. The non-transitory computer-readable media of claim 13, the acts further comprising including an identifier in the second data to provide the indication to the one or more computing devices of the telecommunications network to convert the second data from the second format to the first format.

16. The non-transitory computer-readable media of claim 13, wherein generating the second data comprises formatting packets of the first data to correspond to a packet format associated with the QoS specification.

17. The non-transitory computer-readable media of claim 13, wherein the first data is video game controller data and the application is a video game application.

\* \* \* \* \*